(12) United States Patent
Abuaf et al.

(10) Patent No.: US 6,505,673 B1
(45) Date of Patent: Jan. 14, 2003

(54) METHOD FOR FORMING A TURBINE ENGINE COMPONENT HAVING ENHANCED HEAT TRANSFER CHARACTERISTICS

(75) Inventors: Nesim Abuaf, Schenectady, NY (US); Wayne Charles Hasz, Pownal, VT (US); Ching-Pang Lee, Cincinnati, OH (US); Robert Alan Johnson, Simpsonville, SC (US); Frederick Alan Buck, Sharonville, OH (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/473,295

(22) Filed: Dec. 28, 1999

(51) Int. Cl.[7] ............................. B22C 7/02; B22C 3/00
(52) U.S. Cl. ........................... 164/45; 164/138; 164/47
(58) Field of Search ................................. 164/516, 361, 164/122.1, 122.2, 138, 34, 35, 45, 47

(56) References Cited

U.S. PATENT DOCUMENTS

| | | | | |
|---|---|---|---|---|
| 4,421,153 A | * | 12/1983 | Wilkinson et al. | 164/35 |
| 4,689,242 A | * | 8/1987 | Pike | 427/34 |
| 4,774,990 A | * | 10/1988 | Yamamoto et al. | 164/132 |
| 5,227,251 A | * | 7/1993 | Suichi et al. | 428/687 |
| 5,296,308 A | * | 3/1994 | Caccavale et al. | 428/586 |
| 5,701,948 A | * | 12/1997 | Strezov et al. | 164/480 |
| 5,735,335 A | * | 4/1998 | Gilmore et al. | 164/516 |
| 5,975,850 A | * | 11/1999 | Abuaf et al. | 416/97 R |
| 5,983,982 A | * | 11/1999 | Vihtelic et al. | 164/516 |
| 6,302,185 B1 | * | 10/2001 | Lee et al. | 164/34 |
| 6,382,300 B2 | * | 5/2002 | Lee et al. | 164/235 |

OTHER PUBLICATIONS

PRAXAIR brochure, "Pastes, transfer tapes, and Preforms".*

* cited by examiner

Primary Examiner—Tom Dunn
Assistant Examiner—Len Tran
(74) Attorney, Agent, or Firm—Patrick K. Patnode; Christian G. Cabou; Armstrong Teasdale LLP

(57) ABSTRACT

A method of forming a turbine engine component, includes providing a mold having a textured region, pouring a molten alloy into the mold, and cooling the molten alloy to form a turbine engine component, wherein the turbine engine component has an enhanced surface area region corresponding to the textured region of the mold, the enhanced surface area region comprising randomly arranged bumps.

28 Claims, 1 Drawing Sheet

METHOD FOR FORMING A TURBINE ENGINE COMPONENT HAVING ENHANCED HEAT TRANSFER CHARACTERISTICS

BACKGROUND OF THE INVENTION

The invention relates to components used in turbine engines. More particularly, the invention is directed to methods for forming a turbine engine component that has a textured surface to enhance the heat transfer characteristics of the component.

Various techniques have been devised to maintain the temperature of turbine engine components below critical levels. As an example, coolant air from the engine compressor is often directed through the component, along one or more component surfaces. Such flow is understood in the art as "backside air flow," where coolant air is directed at a surface of an engine component that is not directly exposed to high temperature gases from combustion. In combination with backside air flow, turbulation has been used to enhance heat transfer. Turbulation has generally taken the form of protuberances or "bumps" on selected sections of the surface of the component, which functions to increase the heat transfer with the use of a coolant medium that is passed along the surface. Turbulation is formed by one of several techniques, including wire spraying and casting.

While turbulation has been found to improve the heat transfer characteristics of the treated component, further heat transfer improvements are continually sought in the art, and improved techniques for treating components to have enhanced heat transfer characteristics are needed.

BRIEF SUMMARY OF THE INVENTION

A method of forming a turbine engine component, includes providing a mold having a textured region, pouring a molten alloy into the mold, and cooling the molten alloy to form a turbine engine component, wherein the turbine engine component has an enhanced surface area region corresponding to the textured region of the mold, the enhanced surface area region comprising randomly arranged bumps.

DETAILED DESCRIPTION OF THE INVENTION

Figure 1:
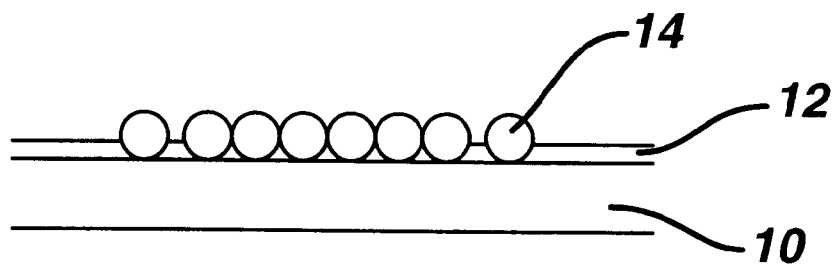
FIG. 1 is a cross-sectional view of a core die according to an aspect of the present invention.

Embodiments of the present invention are drawn to processes for forming a turbine engine component. While the type of turbine engine component can vary widely, it is often a part used in the high-pressure stage of a turbine engine, such as an airfoil. Airfoils include stationary airfoils such as nozzles or vanes, and rotating airfoils including buckets or blades. Other components used in areas of the turbine engine outside the high-pressure stage include shroud clearance control areas, including flanges, casings, and rings. Embodiments of the present invention are particularly suited for components that are formed by casting.

While turbine engine components according to embodiments of the present invention can be formed of any metallic material or alloy, they are generally formed of a heat-resistant alloy designed for high-temperature environments, such as above 1000° C. Some heat-resistant alloys are "superalloys" including cobalt-based, nickel-based, and iron-based alloys, and find particular application in the high-pressure stage of the turbine engine. In one embodiment, the superalloy is nickel or cobalt based, wherein nickel or cobalt is the single greatest element by weight. Illustrative nickel-based superalloys include at least about 40 wt % Ni, and at least one component from the group consisting of cobalt, chromium, aluminum, tungsten, molybdenum, titanium, and iron. Examples of nickel-based superalloys are designated by the trade names Inconel®, Nimonic®, Rene® (e.g., Rene®80-, Rene®95, Rene® 142 and Rene® N5), and Udimet®, and include directionally solidified and single crystal superalloys. Illustrative cobalt-based superalloys include at least about 30 wt % Co, and at least one component from the group consisting of nickel, chromium, aluminum, tungsten, molybdenum, titanium, and iron. Examples of cobalt-based superalloys are designated by the trade names Haynes®, Nozzaloy®, Stellite® and Ultimet®. Heat-resistant non-superalloys include Inconel® 718, Inconel® 900 series, and Waspaloy®.

According to an embodiment of the present invention, a turbine engine component having enhanced heat transfer characteristics is made by a casting operation, where molten alloy is flowed into a mold. In the case of an airfoil, the mold includes a core and a shell, fabricated by what is know in the art as the lost wax process. Typically, the mold is formed of a ceramic material to withstand the high temperatures generally associated with casting a molten alloy to form the airfoil. Typical ceramic materials include alumina, silica, and combinations thereof.

The ceramic core is fabricated by casting a ceramic slurry in a core die. The core die generally replicates the interior cavity of the airfoil and is formed of an alloy for mechanical durability, to enable repeated use of the core die to make multiple cores. The core die generally is sectioned so that the core die can be disassembled to enable removal the cast core intact. The core die may have two halves, or three or more sections depending on the geometric complexity of the core. The core die is typically made by machining, such as electro-discharge machining (EDM) based on a computer model of the interior cavity of the airfoil. According to a particular development of the present invention, the core die has an enhanced surface area region characterized by protrusions, such random bumps having a sandpaper-like appearance.

In the case of fabrication of the core die by electro-discharge machining, it is difficult to form random bumps. According to an embodiment of the present invention, the enhanced surface area region is generally formed by application of a particulate phase, a powder, to the core die. The powder generally has an average particle size less than about 1000 microns, such as less than 600 microns. Particular embodiments have an average particle size less than 375 microns. Typical embodiments have an average particle size within a range of about 125 to about 375 microns. The roughness producing powder can include any metal that can withstand the core casting procedure, such as stainless steel, steel, etc.

The particulate phase or powder is generally bonded to the core die by use of a bonding agent, such as a braze alloy or a solder. Since the core die is used at fairly low molding temperatures and the fused powder merely needs to withstand the ceramic/binder injection procedure, high temperature bonding agents need not necessarily be used.

The particulate phase can be adhered via an adhesive to a sheet containing braze alloy, and the sheet is then brazed to the core die by heating. The brazing sheet may be in a green, unfired state containing a binder that is volatilize during heating. The sheet may also be in the form of a preform or foil, which does not contain a binder. Such preforms, foils and green sheets are commercially available. Alternatively, the particulate phase may be mixed with the braze alloy in the form of a slurry, and then applied to the core die followed by heating. The particular details of the different techniques are provided below.

Exemplary nickel-base braze alloys include, by weight percent, 2.9 boron, 92.6 nickel, 4.5 tin; 3.0 boron, 7.0 chromium, 3.0 iron, 83.0 nickel, and 4.0 silicon; 19.0 chromium, 71.0 nickel, and 10.0 silicon; 1.8 boron, 94.7 nickel, and 3.5 silicon. However, since the braze alloy is used for bonding the particulate phase on the core die, which is not subject to high-temperature use, many other types of braze alloys may be used. Other examples include Praxair braze alloy sheets. Typically, green braze tapes, such as those that are commercially available, are formed by tape casting and drying a slurry containing a binder and braze alloy powder. Typical thicknesses range from about 1 micron to about 250 microns, and preferably, in the range of about 25 microns to about 125 microns. A variety of materials are generally used as binders in the slurry for forming the green braze tape. Non-limiting examples include water-based binders can also be used. Additional organic solvent (e.g., acetone, toluene, or various xylenes) or water may be added to the slurry to adjust viscosity. An example of a commercial product is the Amdry line of braze tapes, available from Sulzer Metco. An exemplary grade is Amdry®100.

The particulate phase that is applied to the green braze tape is typically a coarse powder, being formed of particles having a size sufficient to form random, low profile surface enhancing bumps, which, when replicated in the final airfoil, function to increase heat transfer. In many embodiments, the size of the particles is determined in large part by the desired degree of surface roughness and surface area (and consequently, heat transfer) that will be provided by the bumps. Surface roughness is characterized herein by the centerline average roughness value "Ra", as well as the average peak-to-valley distance "Rz" in a designated area as measured by optical profilometry. According to an embodiment, Ra is greater than about 0.1 mils, such as greater than about 1.0 mils, and preferably greater than about 2.0 mils. Ra is typically less than about 10 mils. Similarly, according to an embodiment, Rz is greater than about 1 mil, such as greater than about 5 mils. Rz is typically less than about 40 mils, more typically less than about 25 mils, such as less than 15 mils. As used herein, the term "particles" may include fibers, which have a high aspect ratio, such as greater than 1:1.

The powder is generally randomly applied by a variety of techniques, such as sprinkling, pouring, blowing, roll-depositing, and the like. Random arrangement denotes presence of the powder particles in no recognizable pattern or periodicity. In one embodiment, prior to being brazed, the particles are shifted on the core die to provide a desired alignment that would be most suitable for heat transfer. For example, acicular particles, including fibers, having an elongated shape may be physically aligned so that their longest dimension extends substantially perpendicular to the surface of the brazing sheet contacting the substrate. The alignment of the powder may be carried out by various other techniques as well. For example, a magnetic or electrostatic source may be used to achieve the desired orientation. In yet another embodiment, individual particles or clusters of particles are coated with braze alloy, and such coated particles are placed on an adhesive sheet for application to a substrate. The adhesive sheet can be formed of any suitable adhesive, provided that it is substantially completely burned-out during the fusing operation.

In another embodiment, the particulate phase is mixed with the other components of the green braze tape, such as braze alloy powder, binder and solvent, during formation of the green braze tape, rather than providing the particulate phase on a surface of the already formed tape.

The tape is then attached to a portion of the core die where surface area enhancement is desired. It is noted that substantially the entirety of the inner surface of the core die may be treated. The tape may be adhered to the core die with adhesive. Alternatively, the green braze tape can be placed on a selected portion of the core die, and then contacted with a solvent that partially dissolves and plasticizes the binder, causing the tape to conform and adhere to the substrate surface. As an example, toluene, acetone or another organic solvent could be sprayed or brushed onto the braze tape after the tape is placed on the substrate.

Following application of the green braze tape to the -core die, the particulate material is fused to the core die. Generally, fusing is carried out by brazing or soldering, which includes any method of joining metals that involves the use of a filler metal or alloy. Fusion of the roughness producing powders usually occurs by soldering (temperatures less than 840° F.) or by brazing (temperatures greater than 840° F.). Fusion is generally carried out in a furnace, although localized heating (e.g., torch welding, electron beam welding, infra-red welding) may be employed.

While the foregoing description focuses on green braze/solder tapes, metal preforms and foils may also be used to bond the particulate phase to the core die. Such preforms are generally made by sintering a green tape or thermal spraying. Foils are prepared the pouring the desired metal melt on a cooled roller, thereby quenching the melt to form a metallic ribbon or foil. Preforms and foils usually have a thickness of about 0.1 micron to about 2500 microns, and preferably, about 25 microns to about 200 microns.

According to another embodiment, the core die is treated by direct application of a slurry. Here, a slurry containing a liquid medium, bonding agent, typically a braze or solder, particulate phase powder, and a binder is directly applied to a surface of the substrate. The slurry is dried, and then the coated substrate is heated such that the bonding agent softens to form a film that bonds the turbulation powder to the substrate. The liquid medium may be water, an organic component such as acetone, toluene, or various xylenes, or mixtures of water and an organic component.

In the embodiments described above, the structure of the component afterfusing includes a solidified bonding agent film that forms a portion of the outer surface of the component, and protuberances or bumps that extend beyond that surface. This structure is shown in FIG. 1, illustrating core die 10, bonding agent sheet 12, and particulate phase 14. The protuberances are generally made up of a particulate phase 14 comprised of discrete particles. The particles may be arranged in a monolayer as shown in FIG. 1, which generally has little or no stacking of particles, or alternatively, clusters of particles in which some particles may be stacked on each other.

According to embodiments of the present invention, the density of particles generally is at least 25 particles/cm$^2$, typically not less than 100 particles /cm$^2$, and desirably not less than 500 particles/cm$^2$. In one embodiment, the particle density was about 1100 particles/cm$^2$, and another 3100 particles/cm$^2$. Further, the surface area enhancement $A/A_{ICD}$, where A is the surface area of the treated region of the component and $A_{ICD}$ is the untreated, initial surface area of the core die (generally a smooth surface), is generally at least about 1.05, typically at least about 1.20. Area enhancement $A/A_{ICD}$ is desirably at least about 1.50. $A/A_{ICD}$ is generally less than about 4.0, typically less than about 2.5. By the techniques described above, the articles are randomly arranged, due to the manner in which the particles are adhered. While the application of the particles is controlled to a certain extent, such as in the form of a monolayer, the precise position of the particles is not predetermined such as in the case of forming bumps or protrusions by EDM.

Thus, after fusing, the treated component has an outer surface defined by the film of bonding agent, which has a particulate phase embedded therein. The film of bonding agent may form a continuous matrix phase. As used herein, "continuous" matrix phase denotes an uninterrupted film along the treated region of the core die, between particles or clusters of particles. Alternatively, the film of bonding agent may not be continuous, but rather, be only locally present to bond individual particles to the core die. In this case, the film of bonding agent is present in the form of localized fillets, surrounding discrete particles or clusters of particles. In either case, thin portions of the film may extend so as to coat or partially coat particles.

Figure 2:
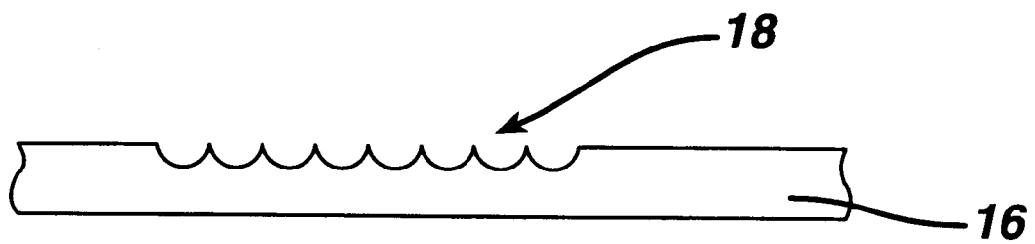
FIG. 2 is a cross-sectional view of a core according to an aspect of the present invention.

The ceramic core is then fabricated. A ceramic slurry containing a ceramic powder, a liquid medium, and binder is injected into the core die. The ceramic powder is generally silica, alumina, or combinations thereof. The core is generally formed of a ceramic material in view of the high temperature casting operation to form the subsequent airfoil. The slurry is permitted to dry to form a ceramic green body, followed by sintering to form a ceramic core. The details of the drying and sintering are known in the art. The ceramic core is shown in FIG. 2. The ceramic core includes main body region 16 and textured region 18. Textured region 18 is the negative of the enhanced surface area region of the core die, where particulate phase 14 is present.

A ceramic shell is then fabricated to complete the mold for casting the turbine engine component. The shell is generally formed by what is known in the art as the 'lost wax process.' Here, a wax die is fabricated, having an inner surface closely matching the outer contour of the airfoil. The wax die is typically formed of an alloy, and fabricated by machining, like electro-discharge machining, based on a computer model of the airfoil. The ceramic core is placed in the wax die, and a molten wax is injected into the space or gap between the ceramic core and the wax die. The wax die is then removed, leaving behind the core having a wax coating thereon whose outer dimensions are of the airfoil shape. The wax coated core is then dipped into a ceramic slurry (similar to the slurry used for forming the core) and then coated with coarse ceramic powders (stuccoed) to form the outer portion of the mold. Steps of dipping and stuccoing are repeated to build up a ceramic coating that has sufficient thickness for mechanical strength. The ceramic coating is then permitted to dry to form the ceramic shell. Dewaxing begins once the shell has dried to a point where the shell is strong enough to withstand the stresses encountered in this operation. Flash dewaxing or an autoclave with steam under pressure are typically used in the dewaxing. The shell and core are then separated, and sintering of the ceramic shell generally follows in a fashion similar to that of the core.

Fabrication of the mold is complete and a casting operation is employed to form the airfoil. A molten alloy, generally a nickel-base or cobalt-base superalloy, is poured into the gap between the ceramic shell and ceramic core. The particular details of the casting operation are not repeated herein, as this operation has been well documented in the art. For high-performance applications, the molten alloy may be directionally solidified via an appropriate thermal gradient for manipulation of the grain structure, or for single crystal growth (no grain boundaries).

Figure 3:
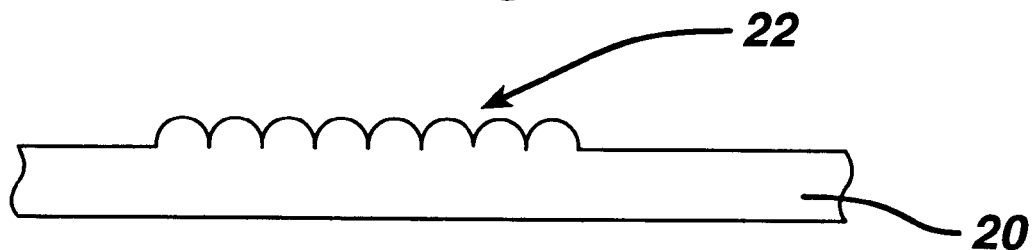
FIG. 3 is a cross-sectional view of an airfoil according to an aspect of the present invention.

The mold is then separated from the component. Typically, the outer ceramic shell is broken away from the cast metal airfoil, and the embedded ceramic core is dissolved away using a suitable etchant which does not attack the final metal airfoil As shown in FIG. 3, the airfoil 20 has an enhanced surface area region 22 that is complementary to the textured surface of the ceramic core, and essentially identical to the enhanced surface area region 14 of the core die. That is, the cast airfoil has a multitude of bumps, replicating the particulate phase of the core die.

According to embodiments of the present invention, the density of bumps is generally is at least 25 bumps/cm$^2$, typically not less than 100 bumps/cm$^2$, and desirably not less than 500 bumps/cm$^2$. In one embodiment, the bump density is about 1100 bumps /cm$^2$, and another 3100 bumps /cm$^2$. Further, the surface area enhancement $A/A_0$, where A is the surface area of the treated region of the component and $A_0$ is the smooth surface area without bumps is generally at least about 1.05, typically at least about 1.20. Area enhancement $A/A_0$ is desirably at least about 1.50. $A/A_0$ is generally less than about 4.0, typically less than about 2.5. Surface roughness is characterized herein by the centerline average roughness value "Ra", as well as the average peak-to-valley distance "Rz" in a designated area as measured by optical profilometry. Ra is greater than about 0.1 mils, such as greater than about 1.0 mils, and preferably greater than about 2.0 mils. Ra is typically less than about 10 mils. Similarly, according to an embodiment, Rz is greater than about 1 mil, such as greater than about 5 mils. Rz is typically less than about 40 mils, more typically less than about 25 mils, such as less than 15 mils. Maintaining Rz below these values is effective to prevent substantial pressure drop of the coolant used, and maintain fin cooling efficiency.

In most embodiments, the enhanced surface area containing bumps is present to enhance the heat transfer characteristics for the airfoil. Heat transfer is improved by improving surface area that is wetted by fluid flow during actual operation. The enhanced heat transfer characteristics in turn result in a desirable temperature reduction for specified regions of the component, leading to a desirable reduction in thermal stress. Moreover, by tailoring the size and density of the bumps (by manipulating the particulate phase), the heat transfer enhancement can also be adjusted, which in turn results in a reduction in the thermal and stress gradients for the component.

Surface area enhancements can be applied to a wide variety of turbine engine components that are formed by casting. For example, other turbine engine components other than airfoils, including combustor liners, combustor domes, or shrouds may have such enhancements. Non-superalloy components used in lower temperature applications may also be treated. For example, shroud clearance control areas, including flanges, casings, and rings may be advantageously treated.

Cooling is generally carried out by impingement cooling, that is, with a coolant medium or fluid that is directed perpendicularly against the surface of the component. It should be understood that while impingement cooling represents a preferable form of cooling, the coolant medium can be directed at varying angles with respect to the textured surface. In addition, while the coolant medium is usually air, it could also be composed of other fluids such as steam.

As described above, enhanced surface area region is cast-in to improve heat transfer. The increase in heat transfer is believed to be largely due to the increased surface area of the treated component. The textured surface may also increase heat transfer by modifying the coolant medium flow characteristics, such as from laminar flow to turbulated flow along the surface.

While embodiments of the present invention have been described with particularity, it is understood in various modifications and can be made without departing from the scope of the claims appended hereto.

What is claimed is:

1. A method of forming a casting core die to create a high density, randomly distributed textured region, comprising the steps of:

providing a core die;

applying a roughness producing powder to said core die, said powder having an average particle size of less than about 1000 microns; and bonding said roughness producing powder to said core die using a bonding agent;

wherein, the textured region of said core die has a ratio of A/Ao greater than about 1.05, wherein A is the surface area of the surface portion and Ao is the surface area without said roughness producing powder.

2. A method in accordance with claim 1, wherein said powder has an average particle size of less than about 600 microns.

3. A method in accordance with claim 1, wherein said powder has an average particle size of less than about 375 microns.

4. A method in accordance with claim 1, wherein said powder has an average particle size in the range between about 125 microns to about 375 microns.

5. A method in accordance with claim 1, wherein said powder is a metal.

6. A method in accordance with claim 1, wherein said powder is a metal selected from the group consisting of stainless steel or steel.

7. A method in accordance with claim 1, wherein said bonding agent is a braze alloy or a solder.

8. A method in accordance with claim 1, wherein said roughness producing powder is bonded to said core die using an adhesive sheet containing a braze alloy.

9. A method in accordance with claim 8, wherein said the adhesive sheet is brazed to said core die by heating said adhesive sheet.

10. A method in accordance with claim 8, wherein said braze alloy is a nickel-base braze alloy include at least one of 2.9 boron, 92.6 nickel, and 4.5 tin or 3.0 boron, 7.0 chromium, 3.0 iron, 83.0 and 4.0 silicon or 19.0 chromium, 71.0 nickel, and 10.0 silicon or 1.8 boron, 94.7 nickel and 3.5 silicon, by weight percent.

11. A method in accordance with claim 8, wherein said braze tape is formed by tape casting and drying a slurry containing a binder and a braze alloy powder.

12. A method in accordance with claim 11, wherein said braze tape has a thickness in the range from about 1 micron to about 250 microns.

13. A method in accordance with claim 11, wherein said binder is selected from the group consisting of water-based organic materials, polyethylene oxides, acrylics or solvent based binders.

14. A method in accordance with claim 8, wherein said roughness producing powder is randomly applied to said adhesive tape by sprinkling, pouring, blowing or roll-depositing.

15. A method in accordance with claim 1, wherein bonding said roughness producing powder to said core die using a bonding agent further includes heating said roughness producing powder.

16. A method in accordance with claim 1, wherein said roughness producing powder comprises a plurality of particles.

17. A method in accordance with claim 16, wherein a density of said particles is in the range between about 25 particles/cm$^2$ to about 3100 particles/cm$^2$.

18. A method in accordance with claim 16, wherein a density of said particles is greater than 1100 particles/cm$^2$.

19. A method in accordance with claim 16, wherein a density of said particles is greater than 3100 particles/cm$^2$.

20. A method in accordance with claim 1, wherein $A/A_0$ is greater than about 1.20.

21. A method in accordance with claim 1, wherein $A/A_0$ is greater than about 1.50.

22. A method in accordance with claim 1, wherein the textured region of said core die has a roughness Rz less than about 40 mils.

23. A method in accordance with claim 1, wherein the textured region of said core die has a roughness Rz less than about 25 mils.

24. A method in accordance with claim 1, wherein the textured region of said core die has a roughness Rz less than about 15 mils.

25. A method in accordance with claim 1, further comprising the steps of casting a ceramic core in said core die, the ceramic core having a textured region corresponding to said textured region of said core die.

26. A method in accordance with claim 25, further comprising pouring a molten alloy into a mold comprised of said ceramic core and a ceramic shell.

27. A method in accordance with claim 26, further comprising cooling said molten alloy to form a turbine engine component, wherein the turbine engine component has a textured region corresponding to the textured region of said mold.

28. A method in accordance with claim 27, wherein said turbine engine component is a turbine blade.

* * * * *

UNITED STATES PATENT AND TRADEMARK OFFICE
CERTIFICATE OF CORRECTION

PATENT NO. : 6,505,673 B1
DATED : January 14, 2003
INVENTOR(S) : Abuaf et al.

It is certified that error appears in the above-identified patent and that said Letters Patent is hereby corrected as shown below:

Column 3,
Line 28, after "water-based" insert -- organic materials, such as polyethylene oxide and various acrylics. Solvent-based --.

Column 4,
Line 24, delete "-core" and insert therefor -- core --.
Line 39, delete "the pouring" and insert therefor -- by pouring --.

Column 6,
Line 15, between "airfoil" and "As" insert a period -- . --.

Signed and Sealed this

Fifteenth Day of July, 2003

JAMES E. ROGAN
*Director of the United States Patent and Trademark Office*